United States Patent [19]
Kooi

[11] 4,202,110
[45] May 13, 1980

[54] THEODOLITE TANGENT SCREW SYSTEM

[75] Inventor: J. Peter E. Kooi, Succasunna, N.J.

[73] Assignee: Keuffel & Esser Company, Morristown, N.J.

[21] Appl. No.: 40,365

[22] Filed: May 18, 1979

[51] Int. Cl.² ............................................. G01C 1/00
[52] U.S. Cl. ...................................... 33/299; 33/281
[58] Field of Search ................ 33/285, 292, 290, 281, 33/282, 283, 284, 299; 364/560

[56] References Cited

U.S. PATENT DOCUMENTS

| | | | |
|---|---|---|---|
| 3,093,904 | 6/1963 | Baker | 33/285 |
| 4,084,327 | 4/1978 | Kooi | 33/299 |
| 4,146,927 | 3/1979 | Ericksen et al. | 364/560 |

Primary Examiner—Steven L. Stephan
Attorney, Agent, or Firm—Lionel N. White

[57] ABSTRACT

Azimuth and elevation adjustments in a geodetic instrument are provided by systems which include coaxial locking and two-speed adjustment control knobs. In each such system, the control knobs are accessible at both the front and rear of the instrument to facilitate operation in either of the forward- or back-sighting mode.

9 Claims, 1 Drawing Figure

U.S. Patent
May 13, 1980
4,202,110
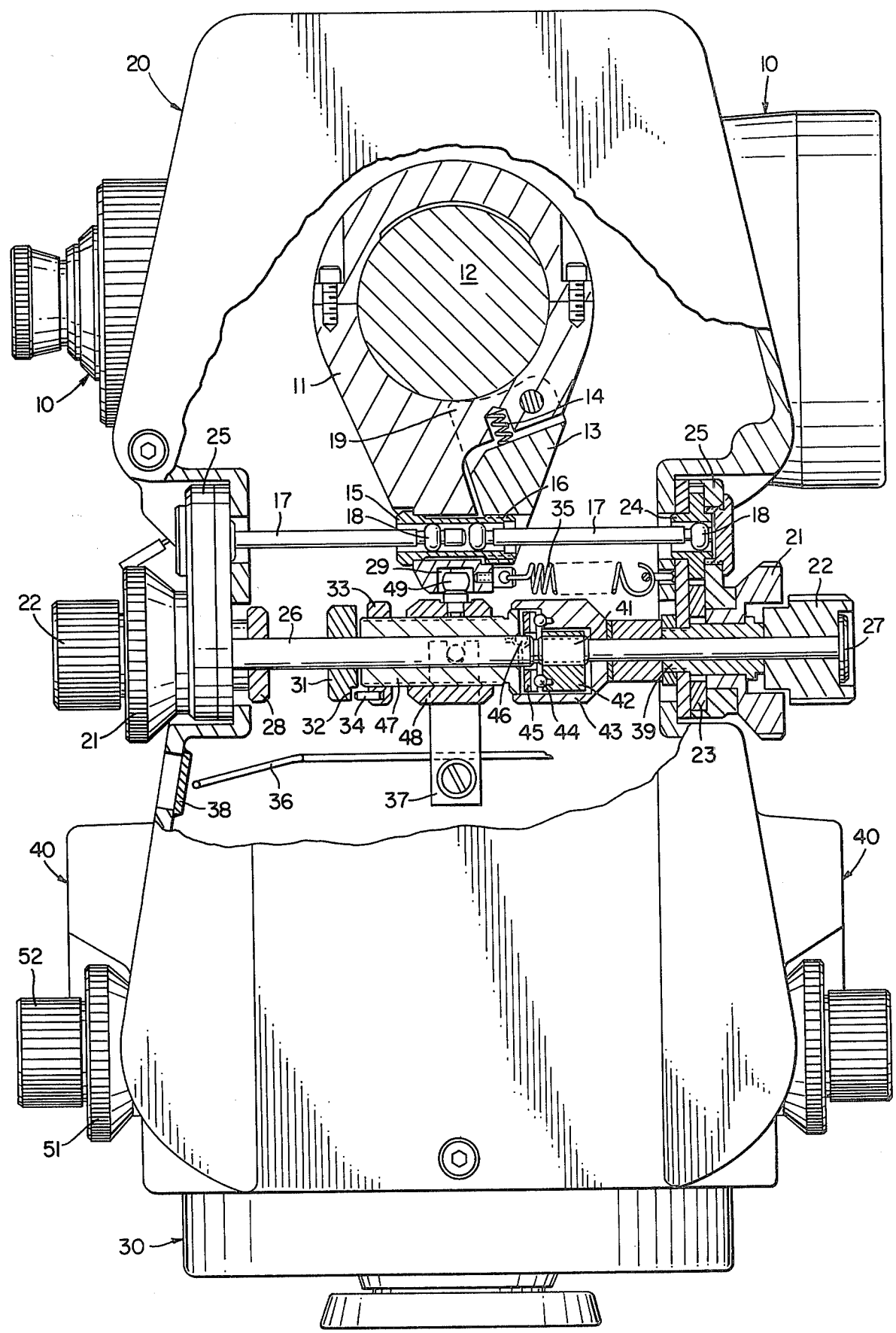

THEODOLITE TANGENT SCREW SYSTEM

BACKGROUND

In geodetic instruments, such as transits and theodolites comprising a stationary base, an alidade standard which rotates upon the base about a vertical spindle, and a telescope supported by the standard to rotate about a horizontal axle, means are normally provided which will enable precise, minute displacement of the alidade standard and the telescope about their respective axes during the acquisition of a target under observation. Such adjustment systems usually comprise means for clamping an extending arm member to the axle or spindle, and means, usually including an advancement screw member, for displacing the distal arm end to achieve the desired adjustment. This type of "tangent screw" system particularly adapted for use in a transit surveying instrument is described in U.S. Pat. No. 3,093,904.

In such earlier adjustment systems the respective locking means and screw advancement means were positioned about the instrument in relatively widely separated locations; however, such arrangements were not then inconvenient, since the operator was required by the external scale arrangements to move about the instrument when taking readings and could thus not normally maintain a casual stationary position at the eyepiece of the telescope. With the advent, however, of the electronic geodetic instrument, such as that described in U.S. Pat. No. 4,146,927, having digital readout means located in the vicinity of the telescope eyepiece, the operator is able to maintain a working position behind the instrument and as a result has come to demand that the displacement adjustment controls be located together at a near face of the instrument.

Those utilitarian demands were in part satisfied by the coaxial adjustment controls described in U.S. Pat. No. 4,084,327; however, their location at one side of the instrument resulted in a somewhat inconvenient displacement from right to left side during the plunging and reversing of the telescope. In the present invention, however, this shortcoming is eliminated in that matched control knob pairs by which each of the elevation and azimuth adjustment is effected are situated at both of the opposite working of the instrument, thereby enabling the operator to directly control adjustment regardless of the position of the telescope with respect to the alidade standard. Further, an additional advantage of this arrangement of control knobs in the faces of the instrument, rather than the side plate, is realized in that the adjustment system remains operative during maintenance procedures which normally require removal of the alidade side plate to obtain access to the instrument interior.

SUMMARY

In the present adjustment control system, coaxial knob and force tranfer mechanisms such as described in U.S. Pat. No. 4,084,327 are located, with respect to each of the azimuth and elevation tangent arms, at both the "front" and "rear" faces of a geodetic instrument. From these force transmitting elements there extend internally of the instrument the control rods and shaft which operate the locking and advancement mechanisms in order that the instrument adjustment may readily be accomplished by the operator at the instrument face immediately before him regardless of the forward or reverse disposition of the instrument telescope in the alidade standard.

Thus either of the pair of locking knobs may be utilized to engage the tangent arm firmly upon the desired axle of rotation and either of the advancement knobs may be utilized to rotate the main screw shaft by which an internal drive collar is put into motion to displace the tangent arm to effect the desired elevational or azimuthal displacement adjustment.

The present system also provides a means by which a two-speed coarse and fine adjustment may be obtained from a single adjustment control knob. This two-speed system represents a substantial improvement over that generally described in U.S. Pat. No. 3,093,904, particularly in its capability of operation from the bilaterally disposed control stations and its mechanical arrangement which realizes economical commonality of parts and ensures a sealed dust-free environment for the working elements of the system and the geodetic instrument as a whole.

DRAWING

In the accompanying drawing FIGURE a portion of the alidale cover plate of a typical geodetic instrument, such as an electronic theodolite, is cut away to reveal in partial section the elements of the adjustment system of the present invention as applied to control the elevation of the telescope of the theodolite.

DESCRIPTION

The construction and operation of the adjustment system of the present invention will readily be seen in the drawing which depicts a typical theodolite geodetic instrument comprising a telescope 10 which is supported in alidade standard 20 upon an axle 12 to rotate about a transverse horizontal axis. Alidade 20 is in turn supported upon the stationary base 30 to rotate about the vertical axis of a central spindle (not shown). The theodolite instrument shown in the drawing is of the type which utilizes electronic indexing and scaling systems, as described in U.S. Pat. No. 4,146,927, and comprises electronic digital display means 40 located at each of the front and rear faces for ready observation by the operator regardless of whether the telescope is in the normal or plunged position.

In addition to coaxial elevation control knob sets 21, 22 associated with that system to be more specifically described below, the instrument includes knob sets 51, 52 associated with an identical system (not shown) which is situated within the instrument in a generally horizontal plane and is arranged to engage the vertical spindle to effect azimuthal adjustment.

The control knob sets comprise a locking knob 21 journaled for rotation about axially bored stud 39 supported in standard 20, and advancement knob 22 made fast to control shaft 26 by means of screw 27. The locking drive train comprises spur gear 23 fixed upon knob 21 and enmeshed with spur gear 24 supported in gear housing 25. Loosely received within the square crosssection axial breach of spur gear 24 is the key end 18, also of square cross-section, of drive link rod 17 the opposite key end of which is received in a square crosssection axial breach of locking bushing 15. An identical assembly situated at the opposite face of the instrument also engages locking bushing 15 by means of a rod 17. As shown, rotation of either locking knob 21 results, through the gear and link rod drive train, in the rotation of bushing 15.

Encompassing axle 12 in a manner to normally effect free rotational movement therebetween is tangent arm 11. Near the distal end of arm 11 there is located a bore in which locking bushing 15 is located for free rotational movement under the influence of drive link rods 17. Pivotally mounted upon and straddling a machined portion of arm 11 is bifurcated jaw member 13 in the distal end of which is located a threaded bore in which is engaged the threaded end 16 of locking bushing 15. Normally biased away from axle 12 by means of compression spring 14, jaw member 13 will be pivoted against such bias by the advancement of threads 16 of rotating bushing 15 to press knuckles 19 into firm locking engagement upon telescope axle 12. Thus, engagement and release of arm 11 with axle 12 is effected by rotation and counter-rotation of locking knob 21.

While telescope 10 is normally free for unlimited rotation about the horizontal axle of axle 12, the locking of tangent arm 11 upon axle 12 will limit elevational movement of telescope 10 to that provided by the advancement mechanism of the present adjusting means. Such means, as shown, comprise a drive shaft 26 journaled for free rotation in the bores of studs 39. To the ends of shaft 26 are affixed control knobs 22, and a split collar 28 is made fast to shaft 26 to restrict the axial movement thereof. A section 41 on the shaft comprises an external thread which engages that of the tapped bore of displacement block 42, the axial movement of which is thus directly controlled by rotation of either of knobs 22. Encompassing block 42 and matching its configuration with an eccentric bore is housing 43, such eccentricity normally restricting rotational movement of block 42 to thereby force axial displacement upon initial rotation of shaft 26. A pair of balls 44 are seated in respective conical sockets in block 42 and housing 43 and are at the same time received in respective transverse V-grooves of floating lever piece 45. Through this arrangement a minute tilting displacement is imparted to lever piece 45 upon rotation of control knob 22.

An externally threaded sleeve 47 in which shaft 26 is normally freely rotatable includes a flanged end which fits within the bore of housing 43 and closely adjacent to lever piece 45. A pair of balls 46 are generally diametrically disposed about shaft 26 in a line substantially orthogonal to the line between balls 44 and are received in conical sockets in the flanged end of sleeve 47 and in respective adjacent parallel V-grooves in lever pice 45, thereby restricting and rotational movement between lever piece 45 and sleeve 47, and additionally forming a bearing for the application to sleeve 47 of lever force generated by the tilting of lever piece 45. Thus the rotation of control knob 22 is translated through the threaded displacement of block 42 and the described lever action to effect an axial displacement of sleeve 47.

In threaded engagement with the exterior of sleeve 47, and thus moving axially therewith, is drive collar 48 in the circumference of which is affixed stud 49. The V-groove wall 29 of a radial bore in the distal end of lever arm 11 is biased into engagement with stud 49 by the urging of tension spring 35, thereby causing arm 11 to smoothly follow any movement of stud 49 longitudinally of shaft 26. The levered displacement of sleeve 47 constitutes a fine adjustment in the system and is thus transferred, through collar 48 and stud 49, to tangent arm 11.

Tightly encompassing shaft 26 is a split collar 31 around a circumferential face of which is formed a rabbet 32 extending over about 340° of the circumference. Similarly made fast to sleeve 47 is a split collar 33 from one face of which extends a pin 32 into near proximity to the walls of rabbet 32. As a result of this arrangement, shaft 26 with its affixed collar 31 is able to rotate freely within the bore of sleeve 47 through a maximum of about 340° whereupon the terminal wall of rabbet 32 engages pin 34 to force the concurrent rotation of sleeve 47 with shaft 26. Prevented from similar rotation by the engagement of stud 49 in groove 29, drive collar 48 is caused to advance longitudinally of shaft 26 along the engaging threads of sleeve 47 with resulting displacement of tangent arm 11.

In a preferred embodiment of the adjusting means of the present invention, a 32-pitch thread is employed between sleeve 47 and collar 48 in order to derive a coarse adjustment, while a 56-pitch thread in section 41 of shaft 26 is combined with a 0.25 lever factor arrangement to yield the fine instrument adjustment. As a result of this combination the coarse-to-fine ratio approximates 10:1.

In order to provide the operator with an indication of the general position of collar 48 along the maximum available course of longitudinal travel and thus allow for optimum initial instrument set up, one end of a pivoted arm 37 is arranged to engage a stud element on the surface of collar 48. The extent of displacement of arm 37, and thus collar 48, is indicated by the relative position, in window 38, of indicator rod 36 attached to arm 37. As a matter of practice, advancement knob 22 would normally be rotated to bring the visible end of rod 36 to the center of window 38, thereby indicating general centering of collar 48 along the available threaded length of sleeve 47, prior to actuating knob 21 to bring jaw knuckle 19 into locking engagement with axle 12.

As earler noted, a substantially identical arrangement of elements is employed to lock a tangent arm upon the vertical center stud of base 30 about which alidade 20 rotates, such azimuthal adjusting system being under the control of locking knobs 51 and advancement knobs 52.

What is claimed is:

1. In a geodetic instrument comprising a stationary base, an enclosed alidade standard rotatable on said base about a central vertical spindle, and a telescope rotatable in said standard on a transverse horizontal axle, an improved system for effecting precise, minute displacement of said alidade standard or telescope, said system comprising:
(a) an arm member associated with said spindle or axle and extending therefrom in a direction transverse to the axis of said spindle or axle, said arm member being arranged to normally pivot freely about said axis;
(b) locking means associated with said arm member for effecting firm engagement between said arm member and said spindle or axle;
(c) means communicating between said locking means and the exterior of said alidade standard for transmitting operating force to said locking means;
(d) a shaft member supported for rotation in said alidade standard and extending in a direction transverse to said axis and said arm member, said shaft member being situated proximate the distal end of said arm member and having at least one of its ends communicating with the exterior of said alidade standard;

(e) externally threaded advancing means encompassing said shaft member in the zone proximate said arm member and being arranged for rotation therewith;

(f) drive means threadedly engaging said advancing means and being displacable axially of said shaft member upon rotation of said advancing means;

(g) means linking said drive means with said arm member distal end to thereby transfer said drive means displacement to said arm member and effect pivotal displacement of said arm member and engaged spindle or axle about the axis thereof;

(h) a first control member affixed to said communicating end of said shaft member whereby rotary motion may be imparted to said shaft member; and (i) a second control member arranged coaxially with said first control member and engaging said means communicating with said locking means whereby operating force may be applied for transmission to said locking means.

2. A system according to claim 1 wherein said locking means comprises:

(a) a jaw member pivotally mounted on said arm member in such a manner as to be capable of being pivoted forcibly into contact with said spindle or axle to thereby clamp said spindle or axle between said jaw member and arm member; and (b) means responsive to the application of operating force to effect said forcible pivoting of said jaw member.

3. A system according to claim wherein said force responsive means comprises screw means extending between said arm member and the distal end of said jaw member.

4. A system according to claim 1 wherein both ends of said shaft member communicate with the exterior of said alidade standard at the front and rear faces, respectively, of said instrument, and wherein third and fourth control member duplicate said first and second control members, respectively, at the opposite end of said shaft member.

5. A system according to claim 1 wherein said advancing means is normally freely movable upon said shaft member and is linked to said shaft member for rotation therewith by rotary lost motion means, whereby the initial rotation of said shaft member subsequent to a change in direction of rotation is independent of said advancing means, and wherein said independent rotation of said shaft member actuates means displacing said advancing means axially of said shaft member.

6. A system according to claim 5 wherein said lost motion means comprises:

(a) a first collar affixed to said shaft member for rotation therewith;

(b) a second collar affixed to said advancing means for rotation therewith;

(c) means associated with one of said collars and extending closely adjacent the other of said collars; and (d) means associated with the other of said collars and situated to engage said extending means only after movement of either of said first and second collars through a substantial portion of the first rotation thereof in one or the other direction.

7. A system according to claim 5 wherein said axial displacing means comprises:

(a) a housing including an axial bore encompassing said shaft member for normally free rotation therein; said shaft member comprising a threaded section situated within a bore;

(b) a drive member within said housing bore encompassing and in threaded engagement with said shaft member threaded section, said drive member being restricted to axial movement with respect to said housing;

(c) a first pair of ball members seated in respective sockets in said housing and said drive member and disposed on substantially diametrically opposite sides of said shaft member;

(d) a lever piece loosely encompassing said shaft member and comprising a pair of diametric V-grooves individually disposed on opposite axial faces of said lever piece and running in orthogonal directions with respect to one another, one of said V-grooves receiving said first pair of ball members;

(e) a second pair of ball members received in the other of said V-grooves and disposed on substantially opposite sides of said shaft member; and (f) a pair of sockets situated in an axial end of said advancing means and each receiving a respective one of said second pair of ball members.

8. A system according to claim 1 including means indicating the relative disposition of said drive means along the maximum available course of axial displacement thereof within said instrument.

9. A system according to claim 8 wherein said indicating means comprises:

(a) a window visibly communicating with the interior of said instrument;

(b) an indicator arm pivotally mounted within said instrument, the distal end of said arm being linked to move with the axial displacement of said drive means; and (c) an indicator rod affixed to said indicator arm for displacement therewith, an end of said rod being so disposed as to be visible through said window to provide said indication to drive means dispostion.

* * * * *